(12) United States Patent
Anderson et al.

(10) Patent No.: US 7,472,914 B2
(45) Date of Patent: Jan. 6, 2009

(54) SUSPENSION SYSTEM

(76) Inventors: Brian K. Anderson, 2178 W. County Road Y, Oshkosh, WI (US) 54901; Jesse Knoble, 831 W. 9th Ave., Oshkosh, WI (US) 54902; Jesse Gander, 8426 Pioneer Rd., Larsen, WI (US) 54947

( * ) Notice: Subject to any disclaimer, the term of this patent is extended or adjusted under 35 U.S.C. 154(b) by 483 days.

(21) Appl. No.: 11/068,513

(22) Filed: Feb. 28, 2005

(65) Prior Publication Data

US 2006/0192361 A1    Aug. 31, 2006

(51) Int. Cl.
*B60G 17/016* (2006.01)
(52) U.S. Cl. .................. 280/5.519; 280/124.157; 280/124.159
(58) Field of Classification Search ......... 280/124.157, 280/124.158, 124.159, 124.16, 5.5, 5.519
See application file for complete search history.

(56) References Cited

U.S. PATENT DOCUMENTS

| | | | |
|---|---|---|---|
| 2,684,254 A | | 7/1954 | Goss |
| 3,752,497 A | | 8/1973 | Enke et al. |
| 3,871,635 A | | 3/1975 | Unruh et al. |
| 4,270,771 A | * | 6/1981 | Fujii ........................ 280/5.514 |
| 4,313,698 A | | 2/1982 | Maykemper et al. |
| 4,505,299 A | | 3/1985 | Welzel et al. |
| 4,552,172 A | | 11/1985 | Krieger et al. |
| 4,557,293 A | | 12/1985 | Guens et al. |
| 4,593,890 A | | 6/1986 | van der Laarse |
| 4,597,557 A | | 7/1986 | Krieger et al. |
| 4,606,551 A | | 8/1986 | Toti et al. |
| 4,660,595 A | | 4/1987 | Küster et al. |
| 4,676,698 A | | 6/1987 | Krieger et al. |
| 4,696,489 A | * | 9/1987 | Fujishiro et al. ......... 280/5.519 |
| 4,782,736 A | | 11/1988 | Krieger et al. |
| 4,787,649 A | | 11/1988 | Watanabe et al. |

(Continued)

FOREIGN PATENT DOCUMENTS

DE     34 27 508 A1    2/1986

(Continued)

OTHER PUBLICATIONS http://web.archive.org/web/20030321170628/www.roadranger.com/products/tire/tire_ctis.htm.*

(Continued)

*Primary Examiner*—Toan To
*Assistant Examiner*—Barry Gooden, Jr.
(74) *Attorney, Agent, or Firm*—Foley & Lardner LLP

(57) ABSTRACT

A vehicle suspension system for use with a vehicle includes a first hydraulic cylinder, a second hydraulic cylinder, and a fluid circuit. The first hydraulic cylinder and the second hydraulic cylinder each include an upper chamber and a lower chamber. The fluid circuit is hydraulically coupled to the first hydraulic cylinder and the second hydraulic cylinder and includes a valve that is movable between a first position and a second position. When the valve is in the first position, the upper and lower chambers of each hydraulic cylinder are hydraulically coupled to the opposite chamber of the other cylinder. When the valve is in the second position, the upper chamber of each hydraulic cylinder is coupled to the lower chamber of the same cylinder. The valve is configured to move between the first position and the second position in response to manual input.

32 Claims, 6 Drawing Sheets

U.S. PATENT DOCUMENTS

| | | | |
|---|---|---|---|
| 4,899,853 A | | 2/1990 | Hummel |
| 4,973,854 A | | 11/1990 | Hummel |
| 5,016,911 A | | 5/1991 | Takehara et al. |
| 5,040,823 A | * | 8/1991 | Lund .................. 280/5.502 |
| 5,046,755 A | | 9/1991 | Runkel et al. |
| 5,080,392 A | * | 1/1992 | Bazergui .................. 188/266.4 |
| 5,087,073 A | | 2/1992 | Lund |
| 5,139,104 A | * | 8/1992 | Moscicki .................. 180/89.13 |
| 5,146,948 A | | 9/1992 | Runkel |
| 5,219,181 A | | 6/1993 | Lund |
| 5,246,247 A | | 9/1993 | Runkel |
| 5,344,124 A | | 9/1994 | Runkel |
| 5,458,218 A | | 10/1995 | Runkel |
| 5,547,211 A | | 8/1996 | Runkel |
| 5,624,105 A | | 4/1997 | Runkel |
| 5,794,966 A | * | 8/1998 | MacLeod .................. 280/5.507 |
| 5,919,240 A | * | 7/1999 | Ney et al. .................. 701/37 |
| 6,102,418 A | | 8/2000 | Runkel |
| 6,264,212 B1 | | 7/2001 | Timoney |
| 6,270,098 B1 | * | 8/2001 | Heyring et al. ......... 280/124.161 |
| 6,318,742 B2 | * | 11/2001 | Franzini .............. 280/124.106 |
| 6,398,236 B1 | * | 6/2002 | Richardson ................ 280/86.5 |
| 6,517,094 B1 | | 2/2003 | Kincaid et al. |
| 6,669,216 B1 | | 12/2003 | Elser et al. |
| 6,923,453 B2 | * | 8/2005 | Pivac .................. 280/6.154 |
| 2005/0093265 A1 | * | 5/2005 | Niaura et al. .......... 280/124.16 |
| 2006/0192354 A1 | * | 8/2006 | Van Cayzeele .......... 280/5.506 |

FOREIGN PATENT DOCUMENTS

| | | |
|---|---|---|
| EP | 0422338 | 4/1991 |
| EP | 0425885 | 5/1991 |
| EP | 0495442 | 7/1992 |
| EP | 0515991 | 12/1992 |
| EP | 0529320 | 3/1993 |
| EP | 0654369 | 5/1995 |
| EP | 0662882 | 7/1995 |
| EP | 0 730 988 A1 | 9/1996 |
| EP | 0824412 | 2/1998 |
| EP | 0 992 415 A1 | 4/2000 |
| EP | 1 138 531 A1 | 10/2001 |
| JP | 2 136319 | 5/1990 |
| JP | 4 100724 | 4/1992 |
| JP | 4 135909 | 5/1992 |
| JP | 5 032111 | 2/1993 |
| WO | WO 9633879 | 10/1996 |

OTHER PUBLICATIONS

PCT International Search Report, based on International Application No. PCT/US2006/006659, dated of mailing of the International Search Report May 26, 2006 (2 pages).

* cited by examiner

SUSPENSION SYSTEM

BACKGROUND

Suspension systems in which a shock absorber on the right side of the vehicle is coupled or cross-linked to a corresponding shock absorber on the left side of the vehicle are known. Such cross-linking of the shock absorbers on the left and right sides of the vehicle (e.g., coupling the upper chamber of each shock absorber to the lower chamber of the corresponding shock absorber on the other side of the vehicle) generally provides greater roll resistance than standard suspension systems that utilize an anti-roll bar in combination with right and left side shock absorbers that are not coupled to one another and that operate independently of one another. However, in such cross-linked suspension systems, the operation of the shock absorber on the left side of the vehicle is affected by the operation of the shock absorber on the right side of the vehicle. Accordingly, the ability of the wheel on the right side of the vehicle (which corresponds to the shock absorber on the right side of the vehicle) to travel up and down relative to the wheel on the left side of the vehicle (which corresponds to the shock absorber on the left side of the vehicle) is limited. Thus, while the cross-linked configuration may be beneficial in some situations, such as when the vehicle is turning a corner on the highway or on a relatively smooth surface, it may be detrimental in other situations, such as when the vehicle is traveling off-road or is otherwise traveling over rough or bumpy terrain. On relatively smooth road surfaces, the independent movement of the right and left wheels has less effect on ride quality because the magnitude of the relative up and down movement between the left and right wheels is likely to be small. When the vehicle is traveling off road or on rough or bumpy terrain, the magnitude of the relative up and down movement between the left and right wheels is likely to be relatively large. In such a situation, it is more desirable to allow the right and left side shock absorbers to operate independently of one another, so that each shock absorber is able to expand or contract to the extent needed to accommodate the unique bumps, dips, etc. that may be encountered by the left wheel and by the right wheel.

Some of the suspension systems that utilize cross-linked shock absorbers are configured so that the suspension system can be alternated between a cross-linked configuration and a straight configuration (e.g., where the upper chamber of each shock absorber is coupled to its own lower chamber rather than the lower chamber of the shock absorber on the opposite side of the vehicle). Many of these systems utilize some type of acceleration sensor that actuates the system between the straight configuration and the cross-linked configuration based on the lateral acceleration experienced by the vehicle. Although these suspension systems avoid some of the problems of a suspension system that is either always in the straight configuration or always in the cross-linked configuration, they introduce other potential problems. For example, many of the systems utilizing acceleration sensors do not give the occupant any control over when the system is in a cross-linked configuration or a straight configuration. Moreover, with these systems, the sensor may cause the suspension system to convert to the cross-linked configuration when it may not be desirable to do so, such as when the vehicle accelerates laterally as a result of one wheel hitting a bump, for example. Once the system converts to the cross-linked configuration (such as when the vehicle is traveling over the bump), the ability of the wheels to move independently is significantly reduced, which affects ride quality.

DETAILED DESCRIPTION OF THE EXEMPLARY EMBODIMENTS

Before providing the description of the exemplary and alternative embodiments of the suspension system, it should be noted that references to "upper," "lower," "left," "right," "front," and "rear" in this description are merely used to identify the various elements as they are oriented in the figures. These terms are not meant to limit the element which they describe, as the various elements may be oriented or arranged differently in various suspension systems.

For purposes of this disclosure, the term "coupled" means the joining of two members directly or indirectly to one another. Such joining may be stationary in nature or moveable in nature and/or such joining may allow for the flow of fluids, electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

Figure 1:
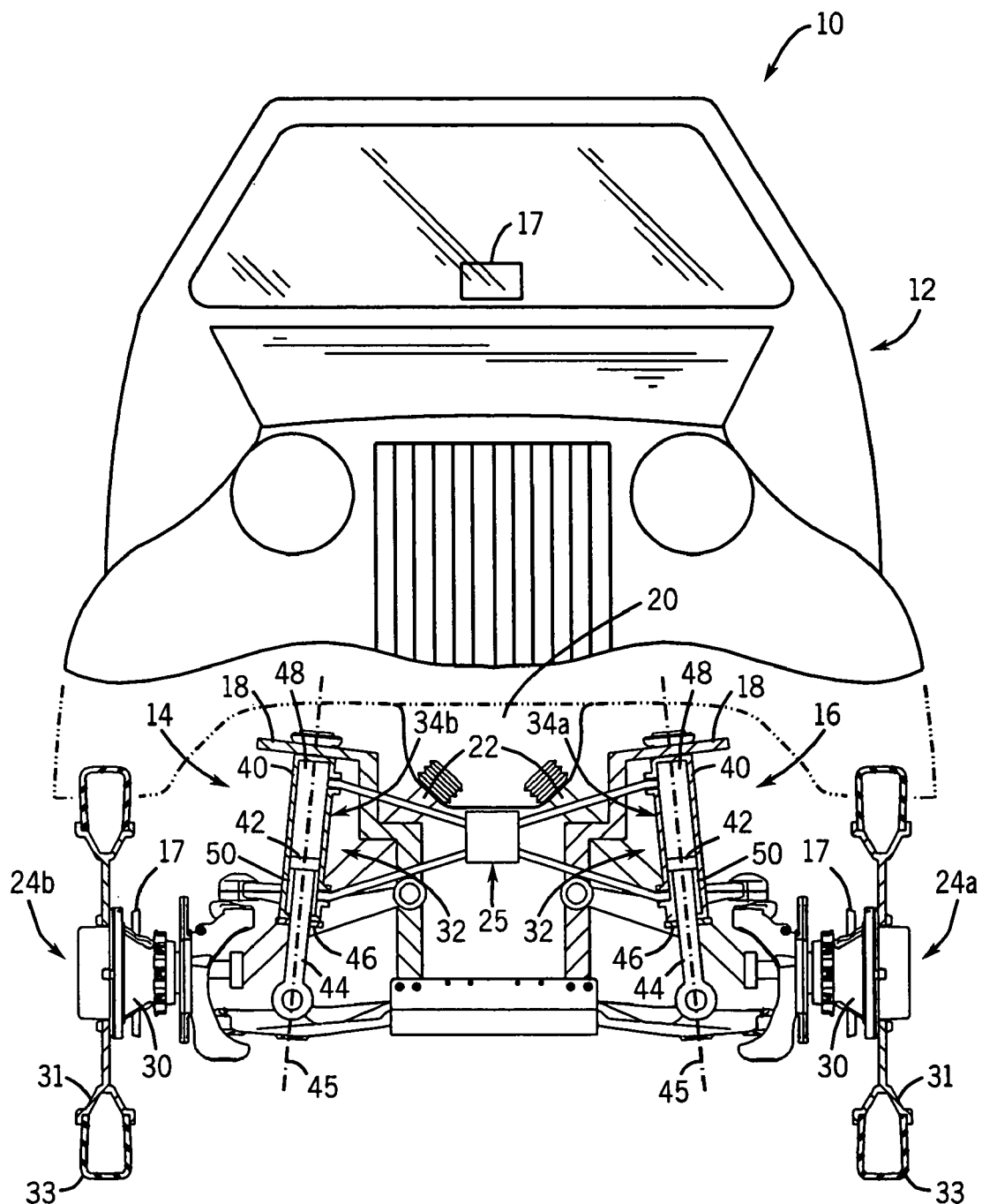
FIG. 1 is a front view of a vehicle having a suspension system according to one exemplary embodiment, where a portion of the suspension system is shown in cross-section.

Referring now to FIG. 1, a vehicle 10 according to one exemplary embodiment includes a body portion 12, a chassis 14, and a central tire inflation system 17.

Body portion 12 is coupled to chassis 14 and generally includes an enclosed area or cab region that is configured to accommodate passengers and which generally serves as the location where an operator of vehicle 10 drives and controls at least some of the various functions of vehicle 10. Body portion 12 may also include other portions or structures that facilitate particular uses of vehicle 10. According to various alternative and exemplary embodiments, the body portion may take one of a variety of different configurations that is suitable for one or more of a variety of different applications. For example, the body portion may be that of dump truck and include a tilting bed or bucket; it may be that of a concrete truck and include a concrete mixing drum; it may be that of a crane and include a boom or a hoist; it may be that of a fire truck and be configured to accommodate various fire related equipment such as ladders, water tanks, etc.; it may be that of a emergency response vehicle and be configured to include various medical equipment, crowd control equipment, explosion containment equipment, etc.; it may be that of a military vehicle and be configured to transport, house, or carry a variety objects; or it may be the body portion of a variety of other types of vehicles (heavy duty, medium duty, and light duty) and take one of a wide variety of configurations.

Base structure or chassis 14 generally includes the structure that substantially supports body portion 12 as well as the mechanisms that propel vehicle 10. According to one exemplary embodiment, chassis 14 includes a frame 18, a power source 20, a drivetrain 22, wheel assemblies 24, and a suspension system 16.

Frame 18 is a substantially rigid structure that provides vehicle 10 with the structural support and rigidity needed to support body portion 12 and any cargo vehicle 10 may be carrying. According to one exemplary embodiment, frame 18 is that of a heavy-duty vehicle, such as a dump truck, a cement mixing truck, a fire truck, a military vehicle, etc. According to various alternative and exemplary embodiments, the frame may take one of a variety of different configurations depending on the type of vehicle in which the frame is used. For example, the frame of a heavy duty vehicle, such as a concrete mixing truck or a dump truck, may have a different configuration than the frame portion of a passenger vehicle, such as a common four passenger sedan, due to the different uses and characteristics of the vehicles.

Power source 20 is coupled to frame 18 and generally comprises a source of rotational mechanical energy which is derived from a stored energy source. Examples include, but are not limited to, an internal combustion gas-powered engine, a diesel engine, a turbine, a fuel cell driven motor, an electric motor or any other type of motor capable of providing mechanical energy.

Drivetrain 22 is coupled between power source 20 and wheel assemblies 24 and transfers power (or movement) from power source 20 to wheel assemblies 24 to propel vehicle 10 in a forward or rearward (or other) direction. According to various alternative and exemplary embodiments, the drivetrain may include a transmission, a wheel end reduction unit, and/or a series of motion transferring devices such as drive shafts, joints, differentials, etc. that are coupled together to transfer the torque or power provided by power source 20 to wheel assemblies 24.

Wheel assemblies 24 are coupled to drivetrain 22 and generally serve as the members that engage the ground or surface upon which vehicle 10 is located. Drivetrain 22 causes at least some of wheel assemblies 24 to spin or rotate which, due to the friction between the ground and wheel assemblies 24, imparts translational movement to vehicle 10. Each wheel assembly 24 generally includes a wheel or hub portion 31 that is coupled to drivetrain 22 and a tire portion 33 that substantially surrounds wheel portion 31. Tire portion 33 is generally inflated with air and serves as a shock absorbing device as well as a friction device that restricts the ability of wheel portion 31 to rotate without a corresponding translational propulsion of vehicle 10. For purposes of referring to a particular wheel assembly in the following discussion, the left front wheel assembly will be referred to as wheel assembly 24a, the right front wheel assembly will be referred to as wheel assembly 24b, the left rear wheel assembly will be referred to as wheel assembly 24c, and the right rear wheel assembly will be referred to as wheel assembly 24d.

Suspension system 16 is a system of components that couple wheel assemblies 24a, 24b, 24c, and 24d to frame 18 in a manner that limits, controls, or restrains the manner in which wheel assemblies 24a, 24b, 24c, and 24d are permitted to move relative to frame 18 and in a manner that generally supports frame 18 above wheel assemblies 24a, 24b, 24c, and 24d. According to one exemplary embodiment, suspension system 16 includes a front portion 21 that corresponds to front wheel assemblies 24a and 24b, a rear portion 23 that corresponds to rear wheel assemblies 24c and 24d, and a hydraulic system 25 that is coupled to front portion 21 and rear portion 23 of suspension system 16.

Figure 2:
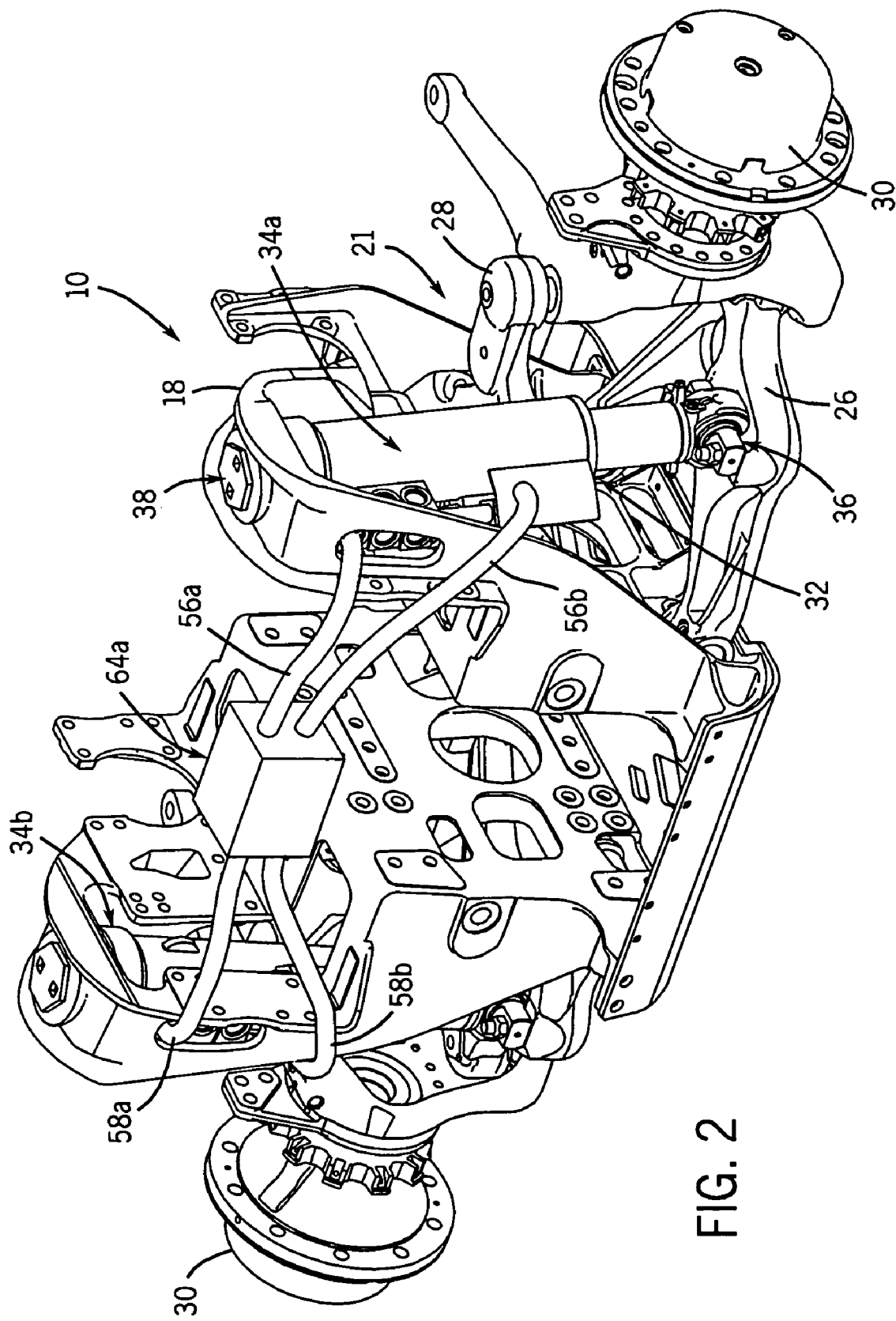
FIG. 2 is a perspective view of a portion of the suspension system according to another exemplary embodiment.

According to one exemplary embodiment illustrated in FIG. 2, front portion 21 of suspension system 16 is of the "independent" suspension configuration (e.g., front wheel assemblies 24a and 24b are not coupled to a single rigid axle and are permitted to move independently of one another) and includes a lower control arm 26, an upper control arm 28, a hub assembly 30, and a cylinder assembly 32 on each side of vehicle 10 to correspond with each of the front wheel assemblies 24a and 24b.

Lower control arm 26 and upper control arm 28 generally control, limit, or restrict, to a certain extent, the movement of hub assembly 30 (and therefore wheel assemblies 24a and 24b) relative to frame 18. Lower control arm 26 and upper control arm 28 are each coupled to a portion of frame 18, with upper control arm 28 being located generally above and parallel to lower control arm 26. Lower control arm 26 and upper control arm 28 each have a first end that is pivotally coupled to a portion of frame 18 and a distal end that is coupled to opposite sides of hub assembly 30, and generally allow hub assembly 30 to translate up and down in response to varying road conditions. According to various alternative and exemplary embodiments, the portion of the frame to which the lower and upper controls arms are coupled, the upper control arm, and/or the lower control arm may take one of a variety of different shapes, sizes, and configurations depending upon the characteristics of the vehicle in which suspension system 16 is incorporated and the configuration of suspension system 16.

Hub assembly 30 is coupled to lower and upper control arms 26 and 28 and generally includes certain components of the brake system of the vehicle as well as the structure or hub to which wheel portion 31 of wheel assembly 24a or 24b is mounted. Hub assembly 30 may also be coupled to a portion of drivetrain 22 (e.g., in a front wheel drive or four wheel drive vehicle). In addition to transferring the movement or torque provided by drivetrain 22 to wheel assemblies 24a and 24b in certain vehicles, hub assembly 30 generally transfers the movement of wheel assemblies 24a and 24b to the other components of suspension system 16 (e.g., lower and upper control arms 26 and 28, cylinder assembly 32, etc.). According to various exemplary and alternative embodiments, the hub assembly may include one or more of a variety of different components and may take one of a variety of different configurations.

Cylinder assembly 32 (e.g., shock, strut, hydraulic-pneumatic spring, fluid spring, suspension member, etc.) extends between lower control arm 26 and frame 18 and generally controls, limits, and/or dampens the movement of lower control arm 26 relative to frame portion 18. Cylinder assembly 32 includes a cylinder 34, a joint 36, and a mounting apparatus 38.

Referring again to FIG. 1, cylinder 34 may be any one of a variety of different cylinders or suspension members, including those that are commercially available from a variety of different sources. For example, the cylinder may be a conventional shock absorber or strut or other type of hydraulic and/or pneumatic cylinder. According to one exemplary embodiment, cylinder 34 is a cylinder that has the characteristics of both a spring (similar to those used in conventional suspension systems) and a shock. One example of such a cylinder is a hydro-pneumatic spring that is modified to include a damping valve. According to one exemplary embodiment, cylinder 34 includes a tube 40, a piston 42, a piston rod 44, and a cap 46 that each share a longitudinal axis 45. Tube 40 is a generally cylindrical tube having an open end and a closed end. Piston 42 is inserted into the open end of tube 40 and is generally configured to slide along the inside of tube 40. Piston 42 seals against the inside diameter of tube 40 (through the use of a seal, such as an o-ring or other suitable seal) and generally forms two separate chambers within tube 40: an upper chamber 48 formed between the closed end of tube 40 and piston 42 and a lower chamber 50 formed between the open end of tube 40 (which is covered by cap 46) and piston 42. Piston rod 44 is coupled to piston 42 and extends through the open end of tube 40 and through cap 46. As piston 42 slides or moves along the length of tube 40, piston rod 44 moves into and out of the open end of tube 40. Cap 46 is coupled to the open end of tube 40 and includes an aperture through which piston rod 44 extends. Cap 46 includes sealing members, such as o-rings or other suitable seals, that allow cap 46 to form seals against both tube 40 as well as piston rod 44. The seal formed with piston rod 44 is configured to allow piston rod 44 to slide in and out of tube 40 without the contents (particularly the highly pressurized contents) of lower chamber 50 leaking out between piston rod 44 and cap 46. The overall length of cylinder 34 changes as piston rod 44 moves into and out of tube 40 in response to the application of a force, such as a force exerted by hydraulic fluid within the cylinder 34 or a force exerted by an element coupled to cylinder 34. According to various exemplary embodiments, the ratio of the area of piston 42 that faces lower chamber 50 and that is not covered by piston rod 44 (e.g., the area of piston 42 upon which the fluid within lower chamber 50 acts) to the area of piston 42 that faces upper chamber 48 is between 0:1 and 1:1, more particularly between 1:2 and 1:4.

For purposes of referring to a particular cylinder in the following discussion, the cylinder corresponding to wheel assembly 24a will be referred to as cylinder 34a, the cylinder corresponding to wheel assembly 24b will be referred to as cylinder 34b, the cylinder corresponding to wheel assembly 24c will be referred to as cylinder 34c, and the cylinder corresponding to wheel assembly 24d will be referred to as cylinder 34d.

Referring again to FIG. 2, joint 36 is a member or assembly that serves to couple cylinder 34 to lower control arm 26 in a manner that allows cylinder 34 and lower control arm 26 to rotate or pivot relative to one another as suspension system 16 operates. One example of a joint is described in copending PCT Application Serial No. PCT/US2004/028759, filed on Sep. 3, 2004, by Knoble et al., entitled JOINT, the full disclosure of which is hereby incorporated by reference herein. According to various alternative and exemplary embodiments, the joint may take one of a variety of different shapes, sizes, and configurations.

Mounting apparatus 38 is a member or assembly that serves to couple cylinder 34 to a portion of frame 18 in a manner that allows cylinder 34 to rotate, pivot, or articulate relative to frame 18 as suspension system 16 operates. One example of a mounting apparatus is described in copending U.S. patent application Ser. No. 10/933,809, filed on Sep. 3, 2004, by Knoble et al., entitled MOUNTING APPARATUS, the full disclosure of which is hereby incorporated by reference herein. According to various alternative and exemplary embodiments, the mounting apparatus may take one of a variety of different shapes, sizes, and configurations.

According to one exemplary embodiment, rear portion 23 of suspension system 16 is also of the "independent" type and is configured in much the same way as front portion 23. Although the control arms, the hubs, and the cylinder assemblies of the rear portion may have different sizes, shapes, and/or configuration than those of front portion 21, they operate in the same general manner. Thus, a further description of the components of rear portion 23 will not be provided. According to one exemplary embodiment, cylinders 34c and 34d of rear portion 23 are identical to cylinders 34a and 34b of front portion 21. According to various alternative and exemplary embodiments, the cylinders or other components of the rear portion of the suspension system may be different sizes and shapes and may be configured differently than the corresponding cylinders or components of the front portion of the suspension system. According to another alternative embodiment, the rear portion of the suspension system may be of the "dependent" type (e.g., where rear wheel assemblies 24c and 24d are connected to a single, rigid axle that prevents them from moving independently of each other) and may be adapted to suit one or more rigid axles. For example, the rear portion may include different components that allow the cylinders to be coupled between the axle and the frame of the vehicle.

Suspension system 16 may take one of a variety of different configurations. For example, front portion 21 of suspension system 16 may be configured differently than rear portion 23 of suspension system 16, or front portion 21 and rear portion 23 may have the same configuration. According to various alternative and exemplary embodiments, the front and rear portions of the suspension system may both be "dependent," or the rear portion of the suspension system may be "independent" while the front portion of the suspension system may be "dependent."

According to other alternative and exemplary embodiments, the vehicle may have two front wheel assemblies, four front wheel assemblies, or any other number of front wheel assemblies that may or may not be coupled together by one or more single, rigid axles, and a portion of the suspension system may be provided to correspond to each front wheel assembly, each pair of front wheel assemblies, or only a portion of the front wheel assemblies. According to other various alternative and exemplary embodiments, the vehicle may have two rear wheel assemblies, four rear wheel assemblies, eight rear wheel assemblies, or any other number of rear wheel assemblies that may or may not be coupled together by one or more single, rigid axles, and a portion of the suspension system may be provided to correspond to each rear wheel assembly, each pair of rear wheel assemblies, or only a portion of the rear wheel assemblies.

The portion of vehicle 10 that is supported or held up by cylinders 34a, 34b, 34c, and 34d of suspension system 16, or the weight of such portion of vehicle 10 (e.g., frame 18, power source 20, drivetrain 22, and body portion 12), is commonly referred to as the "sprung portion" or the "sprung weight" of vehicle 10. On the other hand, the portion of vehicle 10 that is not supported or held up by cylinders 34a, 34b, 34c, and 34d of suspension system 16, or the weight of such portion of vehicle 10 (e.g., most of the components of suspension system 16 and wheel assemblies 24a, 24b, 24c, and 24d), is commonly referred to as the "unsprung portion" or the "unsprung weight" of vehicle 10.

Figure 3:
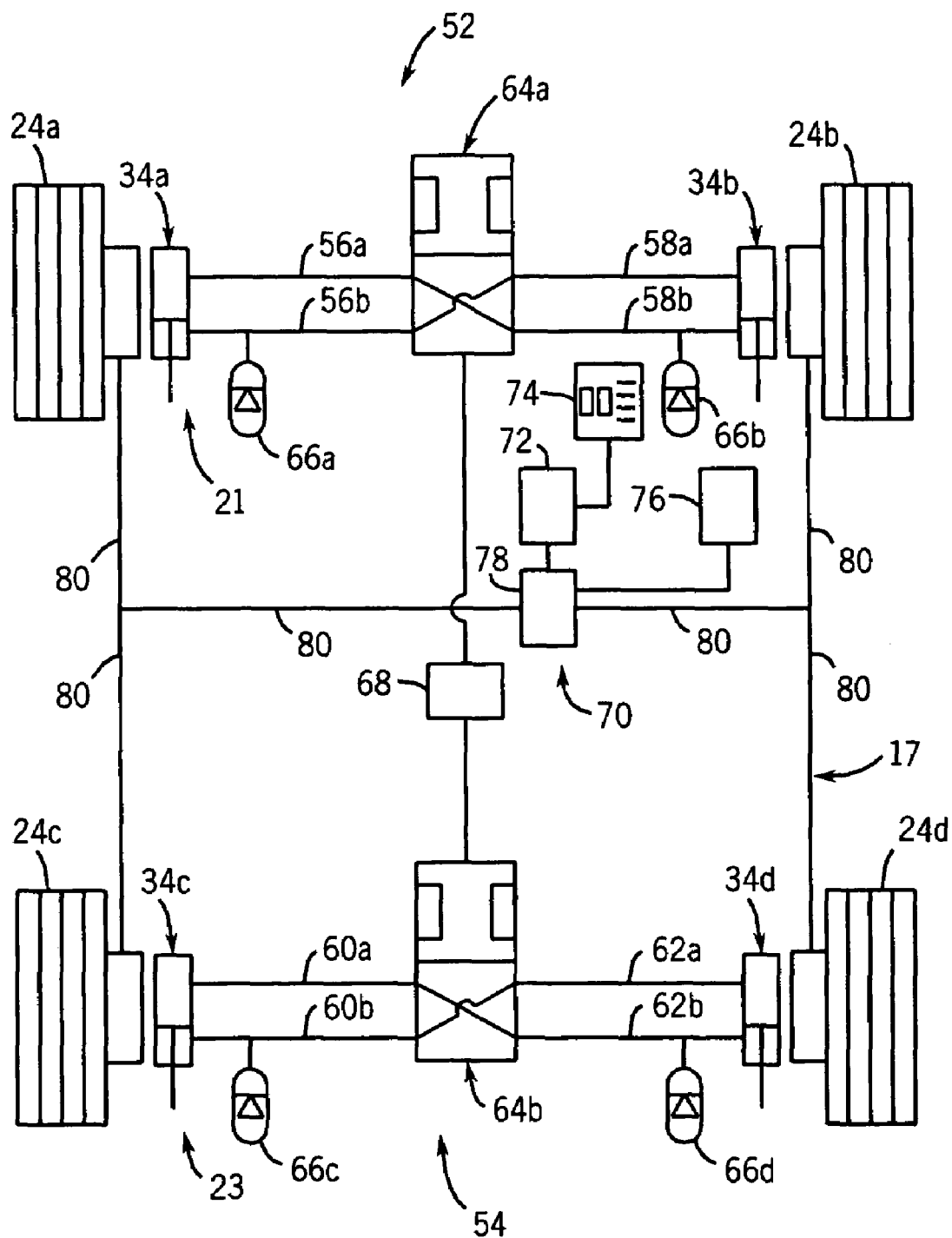
FIG. 3 is a schematic illustration of a portion of the suspension system and the central tire inflation system according to an exemplary embodiment.

Referring now to FIGS. 1 and 3, hydraulic system 25 is a system of fluid lines and other components, such as accumulators, valves, manifolds, reservoirs, pumps, etc., that are hydraulically coupled to cylinders 34a, 34b, 34c, and 34d and that serve to hydraulically couple each of cylinders 34a, 34b, 34c, and 34d to one or more of the other cylinders 34a, 34b, 34c, and 34d. According to various exemplary embodiments, hydraulic system 25 includes fluid lines 56a, 56b, 58a, 58b, 60a, 60b, 62a, and 62b, a valve system 64, one or more accumulators 66, and a control unit 68 that may be arranged in a plurality of different configurations.

In each configuration, the fluid lines of each particular cylinder couple the respective cylinders to the valve system. Specifically, fluid line 56*a* hydraulically couples upper chamber 48 of cylinder 34*a* to valve system 64, fluid line 56*b* hydraulically couples lower chamber 50 of cylinder 34*a* to valve system 64, fluid line 58*a* hydraulically couples upper chamber 48 of cylinder 34*b* to valve system 64, fluid line 58*b* hydraulically couples lower chamber 50 of cylinder 34*b* to valve system 64, fluid line 60*a* hydraulically couples upper chamber 48 of cylinder 34*c* to valve system 64, fluid line 60*b* hydraulically couples lower chamber 50 of cylinder 34*c* to valve system 64, fluid line 62*a* hydraulically couples upper chamber 48 of cylinder 34*d* to valve system 64, and fluid line 62*b* hydraulically couples lower chamber 50 of cylinder 34*d* to valve system 64.

Valve system 64 (e.g., manifold, valve arrangement, etc.) is a system or arrangement of valves that selectively couple one or more of fluid lines 56*a*, 56*b*, 58*a*, 58*b*, 60*a*, 60*b*, 62*a*, and 62*b* to one another based on the position of the individual valves within valve system 64. By controlling the individual valves within valve system 64, the flow of hydraulic fluid (or other fluids or substances used in the hydraulic system) may be selectively directed between upper and lower chambers 48 and 50 of cylinders 34*a*, 34*b*, 34*c*, and 34*d*. How the flow of hydraulic fluid is directed within hydraulic system 25 affects how cylinders 34*a*, 34*b*, 34*c*, and 34*d* will operate, and therefore how suspension system 16 will perform.

Accumulators 66 are generally coupled to one or more of fluid lines 56*a*, 56*b*, 58*a*, 58*b*, 60*a*, 60*b*, 62*a*, and 62*b* and are intended to store hydraulic fluid, to maintain the pressure of the hydraulic fluid, and/or to apply pressure to the hydraulic fluid. According to one exemplary embodiment, accumulator 66 is a piston style accumulator and includes an enclosed, cylindrical housing and a piston that is disposed within the housing and configured to divide the housing into two separate chambers. One of the chambers is filled with a compressible gas while the other is filled with hydraulic fluid. As the pressure (or volume) of the hydraulic fluid changes, the piston slides within the housing until it reaches a point where the pressure of the gas is equal to the pressure of the hydraulic fluid. When the fluid pressure decreases, the piston slides within the housing to increase the volume of the gas chamber until the pressure of the gas is substantially equal to the fluid pressure, which forces fluid out of the chamber. When the fluid pressure increases, the piston slides within the housing to decrease the volume of the gas chamber until the pressure of the gas is substantially equal to the fluid pressure, which allows more fluid to enter the chamber. According to another exemplary embodiment, accumulator 66 includes a chamber or housing that forms an internal volume. A generally flexible bladder that is filed with a compressible gas (or a diaphragm separating a portion of the chamber that is filled with a compressible gas) is disposed within and occupies at least a portion of the volume of the chamber. The bladder is configured to expand and contract as fluid enters and leaves the chamber. The bladder generally will expand and contract until the pressure of the gas within the bladder equals the pressure of the fluid within the chamber. According to various alternative and exemplary embodiments, each accumulator may take one of a variety of different forms and may utilize various springs, weights, compressed gases, or other potential energy sources.

Control unit 68 (e.g., electronic control unit, controller, computer, microcontroller, control module, etc.) is an electronic device (or multiple electronic devices coupled together) that monitors or measures the value of a variable quantity or condition and that sends signals to, or controls the operation of, valve(s) 64 of hydraulic system 25 based on the value of the variable quantity or condition. According to one exemplary embodiment, control unit 68 monitors or measures the condition or state of central tire inflation system 17 and controls the operation of valve(s) 64 based on the state of central tire inflation system 17. Thus, when control unit 68 detects that central tire inflation system 17 is in a particular state, control unit 68 may cause valve(s) 64 to move into the cross-linked configuration (described below). When control unit 68 detects that the state of central tire inflation system 17 has changed to a different state, control unit 68 may cause valve(s) 64 to move into the straight plumbed configuration (described below).

According to various alternative and exemplary embodiments, the control unit may monitor or measure one of a variety of different variables or conditions, and may control the operation of valve(s) 64 (or other portions of hydraulic system 25, such as a pump or other valve arrangements) based on one or more different variables such as the load carried by the vehicle, the speed of the vehicle, the turning angle of the front wheel assemblies, the lateral acceleration of the vehicle, the ride height of the vehicle, the pressure of fluid within the hydraulic system or particular portions of the hydraulic system, etc. According to other various alternative and exemplary embodiments, the control unit may take one of a variety of different configurations, and may control or send signals to, receive signals from, or monitor, one or more of a variety of different components of vehicle 10. According to still other various alternative and exemplary embodiments, the control unit may or may not be programmable.

According to various alternative and exemplary embodiments, the components of hydraulic system 25 may be arranged in a variety of different configurations depending on the desired performance of suspension system 16. Some of these configurations are described below.

According to a first exemplary embodiment illustrated schematically in FIG. 3, hydraulic system 25 includes two substantially independent subsystems, a subsystem 52 that hydraulically couples cylinders 34*a* and 34*b* of front portion 21 of suspension system 16 and a subsystem 54 that hydraulically couples cylinders 34*c* and 34*d* of rear portion 23 of suspension system 16.

In subsystem 52, fluid lines 56*a* and 56*b* hydraulically couple upper chamber 48 and lower chamber 50 of cylinder 34*a*, respectively, to a valve designated as valve 64*a*, while fluid lines 58*a* and 58*b* hydraulically couple upper chamber 48 and lower chamber 50 of cylinder 34*b*, respectively, to valve 64*a*. An accumulator 66*a* is hydraulically coupled to fluid line 56*b* and an accumulator 66*b* is hydraulically coupled to fluid line 58*b*. Valve 64*a* is configured to be actuated between two different positions. In the first position, referred to as the "cross-plumbed position" or "cross-linked position," valve 64*a* hydraulically couples fluid line 56*a* to fluid line 58*b* (e.g., upper chamber 48 of cylinder 34*a* is hydraulically coupled to lower chamber 50 of cylinder 34*b*) and hydraulically couples fluid line 56*b* to fluid line 58*a* (e.g., lower chamber 50 of cylinder 34*a* is hydraulically coupled to upper chamber 48 of cylinder 34*b*). In the second position, referred to as the "straight-plumbed position," valve 64*a* hydraulically couples fluid line 56*a* to fluid line 56*b* (e.g., upper chamber 48 of cylinder 34*a* is coupled to lower chamber 50 of the same cylinder) and hydraulically couples fluid line 58*a* to fluid line 58*b* (e.g., upper chamber 48 of cylinder 34*b* is coupled to lower chamber 50 of the same cylinder).

Subsystem 54 is configured in the same general manner as subsystem 52. In subsystem 54, fluid lines 60*a* and 60*b* hydraulically couple upper chamber 48 and lower chamber 50 of cylinder 34c, respectively, to a valve designated as valve 64b, while fluid lines 62a and 62b hydraulically couple upper chamber 48 and lower chamber 50 of cylinder 34d, respectively, to valve 64b. An accumulator 66c is hydraulically coupled to fluid line 60b and an accumulator 66d is hydraulically coupled to fluid line 62b. Like valve 64a, valve 64b is configured to be actuated between a cross-plumbed position and a straight plumbed position. In the cross-plumbed position, valve 64b hydraulically couples fluid line 60a to fluid line 62b (e.g., upper chamber 48 of cylinder 34c is hydraulically coupled to lower chamber 50 of cylinder 34d) and hydraulically couples fluid line 60b to fluid line 62a (e.g., lower chamber 50 of cylinder 34c is hydraulically coupled to upper chamber 48 of cylinder 34d). In the straight-plumbed position, valve 64b hydraulically couples fluid line 60a to fluid line 60b (e.g., upper chamber 48 of cylinder 34c is coupled to lower chamber 50 of the same cylinder) and hydraulically couples fluid line 62a to fluid line 62b (e.g., upper chamber 48 of cylinder 34d is coupled to lower chamber 50 of the same cylinder).

The ability to move subsystems 52 and 54 of hydraulic system 25 between a cross-plumbed state and a straight plumbed state allows suspension system 16 to be adjusted to the configuration that is most suitable for the particular situation encountered by vehicle 10. When subsystems 52 and 54 are in the straight-plumbed position, upper chamber 48 of each cylinder 34a, 34b, 34c, and 34d is hydraulically coupled to lower chamber 50 of the same cylinder. Accordingly, each of cylinders 34a, 34b, 34c, and 34d operate substantially independent of one another. The independent operation of cylinder 34a, 34b, 34c, and 34d is generally desirable when vehicle 10 is traveling over relatively rough or bumpy terrain, such as on unpaved roads or on other off road terrain, because each of wheel assemblies 24a, 24b, 24c, and 24d will be encountering a unique series of bumps, dips, etc. that will cause each of wheel assemblies 24a, 24b, 24c, and 24d to move up and down at different times and at different magnitudes. The independent operation of cylinders 34a, 34b, 34c, and 34d helps to increase the total contact wheel assemblies 24a, 24b, 24c, and 24d have with the ground at any one time and also generally helps to improve the ride quality of vehicle 10 in rough or bumpy conditions.

When subsystems 52 and 54 are in the cross-plumbed position, upper chamber 48 of cylinders 34a and 34c are hydraulically coupled to the respective lower chambers 50 of the corresponding cylinders 34b and 34d, and the lower chambers 50 of cylinders 34a and 34c are hydraulically coupled to the respective upper chambers 48 of cylinders 34b and 34d. Accordingly, the operation of each cylinder on the left side of the vehicle (cylinders 34a and 34c) is linked to the operation of the respective cylinders on the right side of the vehicle (cylinders 34b and 34d). In this configuration, suspension system 16 tends to improve the cornering and maneuverability of vehicle 10 when it is traveling at higher speeds on a relatively smooth roadway, such as a highway or interstate. Such improvement is the result, at least in part, of the tendency of suspension system 16 to resist the roll of body portion 12 as vehicle 10 changes direction, such as when it goes around a curve or bend in the road. In this situation, allowing for the completely independent movement of wheel assemblies 24a, 24b, 24c, and 24d is less important because wheel assemblies 24a, 24b, 24c, and 24d move up and down in the same general manner due to the relatively smooth surface over which they are traveling.

The tendency of suspension system 16 to resist roll when in the cross-plumbed configuration derives from the interaction of cylinders 34a and 34c with cylinders 34b and 34d and the configuration of hydraulic system 25. For example, in connection with subsystem 52, as vehicle 10 turns left, body portion 12 and frame 18 tend to lean or roll towards the right side of vehicle 10 due to centrifugal force. This leaning or rolling of frame 18 and body portion 12 applies compressive forces to cylinder 34b and tensile forces to cylinder 34a. The compressive forces applied to cylinder 34b tend to urge piston rod 44 further into tube 40, which reduces the volume of upper chamber 48 of cylinder 34b and pushes fluid out of upper chamber 48. At the same time, the tensile forces applied to cylinder 34a tend to urge piston rod 44 out of tube 40, which reduces the volume of lower chamber 50 of cylinder 34a and pushes fluid out of lower chamber 50. Because upper chamber 48 of cylinder 34b and lower chamber 50 of cylinder 34a are hydraulically coupled together (through fluid lines 56b and 58a, and valve 64a), the fluid displaced from upper chamber 48 of cylinder 34b and from lower chamber 50 of cylinder 34a moves into accumulator 66a. As fluid moves into accumulator 66a, the fluid compresses the gas-filled chamber of accumulator 66a (or otherwise acts on the potential energy device or apparatus utilized by the accumulator), which increases the pressure of the fluid in upper chamber 48 of cylinder 34b, lower chamber 50 of cylinder 34a, fluid line 56b, fluid line 58a, and accumulator 66a. This increase in the pressure of the fluid in upper chamber 48 of cylinder 34b and lower chamber 50 of cylinder 34a occurs shortly after frame 18 starts to roll and resists any further movement of piston rod 44 into cylinder 34b and piston rod 44 out of cylinder 34a, and therefore resists any further roll of frame 18 toward the right side of vehicle 10.

When upper chamber 48 of cylinder 34b and lower chamber 50 of cylinder 34a begin to decrease in size, the opposite chambers, lower chamber 50 of cylinder 34b and upper chamber 48 of cylinder 34a, begin to increase in size. This increase in volume allows fluid that was formerly stored in accumulator 66b to travel to lower chamber 50 of cylinder 34b and upper chamber 48 of cylinder 34a. As the volume of the hydraulic circuit formed by lower chamber 50 of cylinder 34b, upper chamber 48 of cylinder 34a, accumulator 66b, fluid lines 56a and 58b, and valve 64a increases due to the movement of piston rods 44, the fluid exists accumulator 66b, which allows the gas-filled chamber (or other potential energy device or apparatus) in accumulator 66b to expand, which in turn, reduces the pressure within the hydraulic circuit.

According to one exemplary embodiment subsystem 52 and 54 are always in the same configuration such that both subsystems switch between the cross-linked configuration and the straight plumbed configuration at the same time. According to various alternative and exemplary embodiments, one of subsystems 52 and 54 may be in the cross-linked configuration while the other is in the straight plumbed configuration and they may switch between the cross-linked configuration and the straight plumbed configurations at the same time or at different times.

According to other various exemplary and alternative embodiments, only one of subsystems 52 and 54 may be provided on vehicle 10. For example, vehicle 10 may include just subsystem 52 so that only front portion 21 of suspension system 16 can be actuated between a cross-linked configuration and a straight plumbed configuration, while rear portion 23 is configured to permanently remain in a straight plumbed configuration. Whether it is desirable to utilize both of subsystems 52 and 54 (or other subsystems for other pairs or sets of wheel assemblies) or just one of them will depend on the characteristics of the particular vehicle in which the subsystems are used. For example, the use of only subsystem 52 in one vehicle may cause it to perform less desirable than it would perform if only subsystem 54 were used or if both subsystems 52 and 54 were used. In a different vehicle, the use of only subsystem 52 may cause the vehicle to perform more desirable than it would perform if only subsystem 54 were used or if both subsystems 52 and 54 were used. How many subsystems should be used and where will depend on the vehicle within which hydraulic system 25 will be incorporated.

Figure 4:
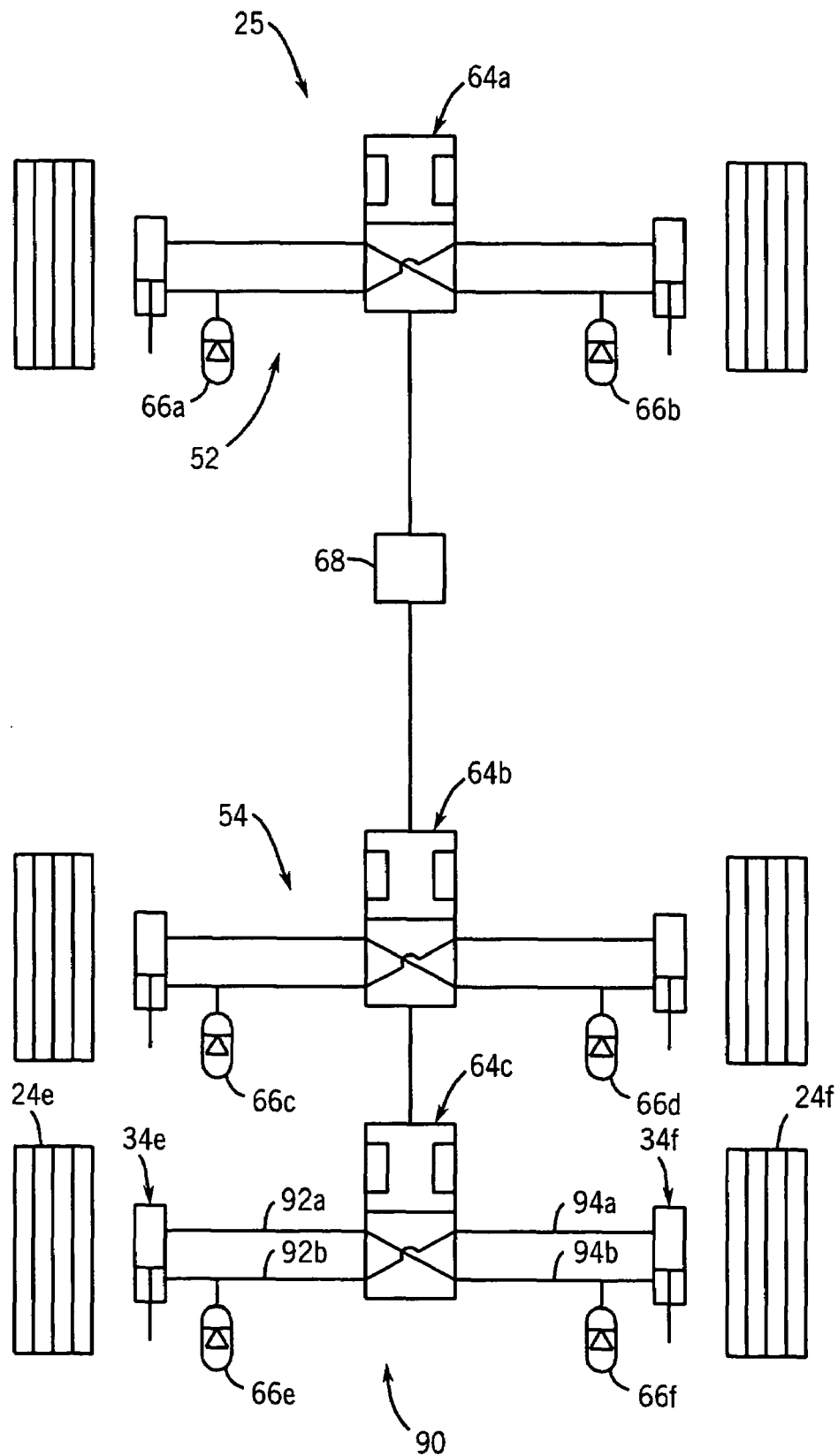
FIG. 4 is a schematic illustration of a portion of the suspension system according to another exemplary embodiment.

According to a second exemplary embodiment illustrated schematically in FIG. 4, hydraulic system 25 is configured to accommodate a vehicle having three sets of wheel assemblies (e.g., a set of front wheel assemblies and tandem rear axles). In this configuration, hydraulic system 25 includes the same subsystems 52 and 54 as described above, but in addition includes a third subsystem 90, which is substantially similar to subsystems 52 and 54. Like each of subsystems 52 and 54, subsystem 90 hydraulically couples cylinders 34e and 34f (the cylinders corresponding to the additional set of wheel assemblies 24e and 24f).

In subsystem 90, fluid lines 92a and 92b hydraulically couple upper chamber 48 and lower chamber 50 of cylinder 34e, respectively, to a valve designated as valve 64c, while fluid lines 94a and 94b hydraulically couple upper chamber 48 and lower chamber 50 of cylinder 34f, respectively, to valve 64c. An accumulator 66e is hydraulically coupled to fluid line 92b and an accumulator 66f is hydraulically coupled to fluid line 94b. Valve 64c is configured to be actuated between the cross-plumbed position and the straight plumbed position. In the cross-plumbed position, valve 64c hydraulically couples fluid line 92a to fluid line 94b (e.g., upper chamber 48 of cylinder 34e is hydraulically coupled to lower chamber 50 of cylinder 34f) and hydraulically couples fluid line 92b to fluid line 94a (e.g., lower chamber 50 of cylinder 34e is hydraulically coupled to upper chamber 48 of cylinder 34f). In the straight-plumbed position, valve 64c hydraulically couples fluid line 92a to fluid line 92b (e.g., upper chamber 48 of cylinder 34e is coupled to lower chamber 50 of the same cylinder) and hydraulically couples fluid line 94a to fluid line 94b (e.g., upper chamber 48 of cylinder 34f is coupled to lower chamber 50 of the same cylinder).

This embodiment of hydraulic system 25 operates in the same general manner as the embodiment of hydraulic system 25 that includes only subsystems 52 and 54, it simply includes an addition subsystem (subsystem 90) that is coupled to the additional set of wheel assemblies 24e and 24f. According to various alternative and exemplary embodiments, the hydraulic system may not include a subsystem that is movable between a straight plumbed configuration and a cross-plumbed configuration for each corresponding pair of wheel assemblies. Instead, such a subsystem may be provided for just the front pair of wheel assemblies, for just a rear pair of wheel assemblies, for each rear pair of wheel assemblies for vehicles with more than one pair of rear wheel assemblies, or for just certain pairs of wheel assemblies, and those wheel assemblies for which such an adjustable subsystem is not provided may be coupled to cylinders that are configured to remain in the straight-plumbed condition.

Figure 5:
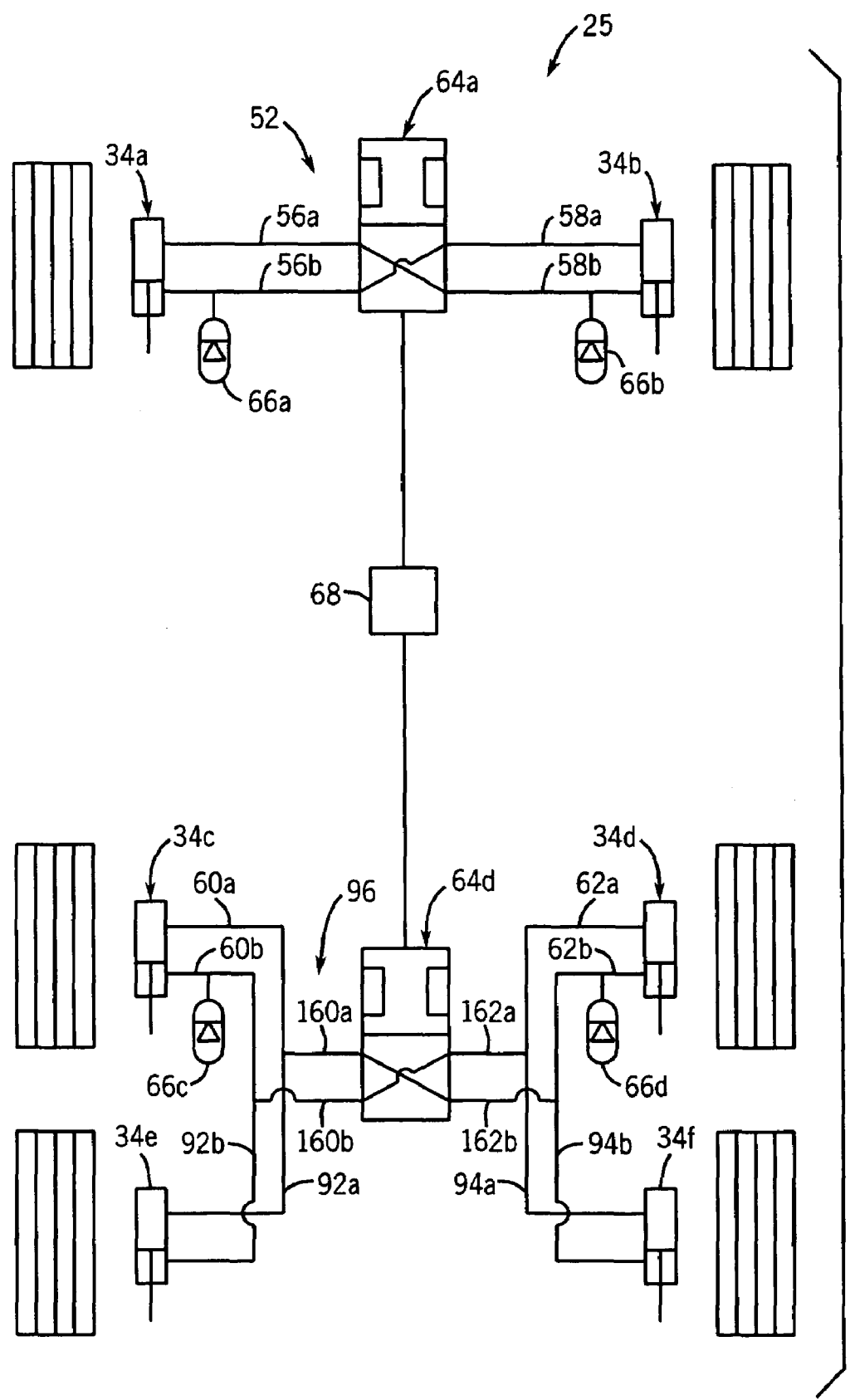
FIG. 5 is a schematic illustration of a portion of the suspension system according to another exemplary embodiment.

According to a third exemplary embodiment illustrated schematically in FIG. 5, hydraulic system 25 is configured to accommodate a vehicle having three sets of wheel assemblies (e.g., a set of front wheel assemblies and tandem rear axles). In this configuration, hydraulic system 25 includes subsystem 52, as described above, that cooperates with the front wheel assemblies and a subsystem 96 that cooperates with the wheel assemblies of the tandem rear axles. Subsystem 96 is configured so that both of the cylinders on the left side of vehicle 10 are hydraulically coupled to one another and to both of the cylinders on the right side of the vehicle, which are also coupled to one another. Thus, rather than having a substantially independent subsystem for each pair of left/right wheel assemblies, which may be actuated between the cross-plumbed configuration and the straight plumbed configuration independently of one another, subsystem 96 links the operation of the two cylinders on each side of the tandem axle of the vehicle and allows the subsystem to be actuated between a state in which both cylinders on each side of the tandem axle are coupled together in a straight plumbed configuration and a state in which both cylinders on the left side of the tandem axle are cross-plumbed to both cylinders on the right side of the tandem axle.

In this configuration, hydraulic system 25 includes the same general components as used in the second configuration, they are just arranged differently. Specifically, fluid line 60a of cylinder 34c is coupled to fluid line 92a of cylinder 34e, and the joined fluid line, shown as fluid line 160a, is coupled to valve 64d. The coupling together of fluid lines 60a and 92a in this way hydraulically couples upper chamber 48 of cylinder 34c with upper chamber 48 of cylinder 34e. Similarly, fluid line 60b of cylinder 34c is coupled to fluid line 92b of cylinder 34e, and the joined fluid line, shown as fluid line 160b, is coupled to valve 64d. An accumulator 66c is coupled to fluid line 60b. The coupling together of fluid lines 60b and 92b in this way hydraulically couples lower chamber 50 of cylinder 34c with lower chamber 50 of cylinder 34e.

Cylinders 34d and 34f on the right side of vehicle 10 are coupled together in the same manner. Specifically, fluid line 62a of cylinder 34d is coupled to fluid line 94a of cylinder 34f, and the joined fluid line, shown as fluid line 162a, is coupled to valve 64d. The coupling together of fluid lines 62a and 94a in this way hydraulically couples upper chamber 48 of cylinder 34d with upper chamber 48 of cylinder 34f. Similarly, fluid line 62b of cylinder 34d is coupled to fluid line 94b of cylinder 34f, and the joined fluid line, shown as fluid line 162b, is coupled to valve 64d. An accumulator 66d is coupled to fluid line 62b. The coupling together of fluid lines 62b and 94b in this way hydraulically couples lower chamber 50 of cylinder 34d with lower chamber 50 of cylinder 34f.

Valve 64d is configured to actuate between a cross-plumbed position and a straight plumbed position. In the cross-plumbed position, valve 64d couples fluid line 160a (which couples upper chambers 48 of cylinders 34c and 34e) and fluid line 162b (which couples lower chambers 50 of cylinders 34d and 34f). Valve 64d also couples fluid line 160b (which couples lower chambers 50 of cylinders 34c and 34e) and fluid line 162a (which couples upper chambers 48 of cylinders 34d and 34f). In the straight plumbed position, valve 64d couples fluid line 160a (which couples upper chambers 48 of cylinders 34c and 34e) and fluid line 160b (which couples lower chambers 50 of cylinders 34c and 34e). Valve 64d also couples fluid line 162a (which couples upper chambers 48 of cylinders 34d and 34f) and fluid line 162b (which couples lower chambers 50 of cylinders 34d and 34f).

Subsystem 96 of this embodiment of hydraulic system 25 operates in the same general manner as subsystem 52 or subsystem 54, described above. However, instead of cross-linking one of the front or rear cylinders to the corresponding front or rear cylinder on the opposite side of the vehicle, this embodiment cross-links the front and rear cylinders on the left side of the tandem axle with the front and rear cylinders on the right side of the tandem axle.

According to various alternative and exemplary embodiments, any two or more cylinders on the left side of the vehicle may be linked to the corresponding two or more cylinders on the right side of the vehicle in the manner described above. For example, the vehicle may include two pairs of front wheel assemblies and two pairs of rear wheel assemblies (e.g., as in a truck having tandem front and rear axles), with a pair of cylinders corresponding to each pair of wheel assemblies. The two pairs of cylinders corresponding to the two pairs of front wheel assemblies and the two pairs of cylinders corresponding to the two pairs of rear wheel assemblies may each be coupled together in the manner described above, where the operation of the two left-hand side cylinders of the two front pair of wheel assemblies is linked and the operation of the two right-hand side cylinders of the two front pair of wheel assemblies is linked, and where the operation of the two left-hand side cylinders of the two rear pair of wheel assemblies is linked and the operation of the two right-hand side cylinders of the two rear pair of wheel assemblies is linked. According to other various alternative and exemplary embodiments, the hydraulic system may be configured so that each pair of cylinders operate independently of one another (e.g., each pair of cylinders forms a substantially independent subsystem) or so that the operation of the left-hand side cylinders and the right-hand side cylinders of any two or more pairs of the cylinders is linked.

Figure 6:
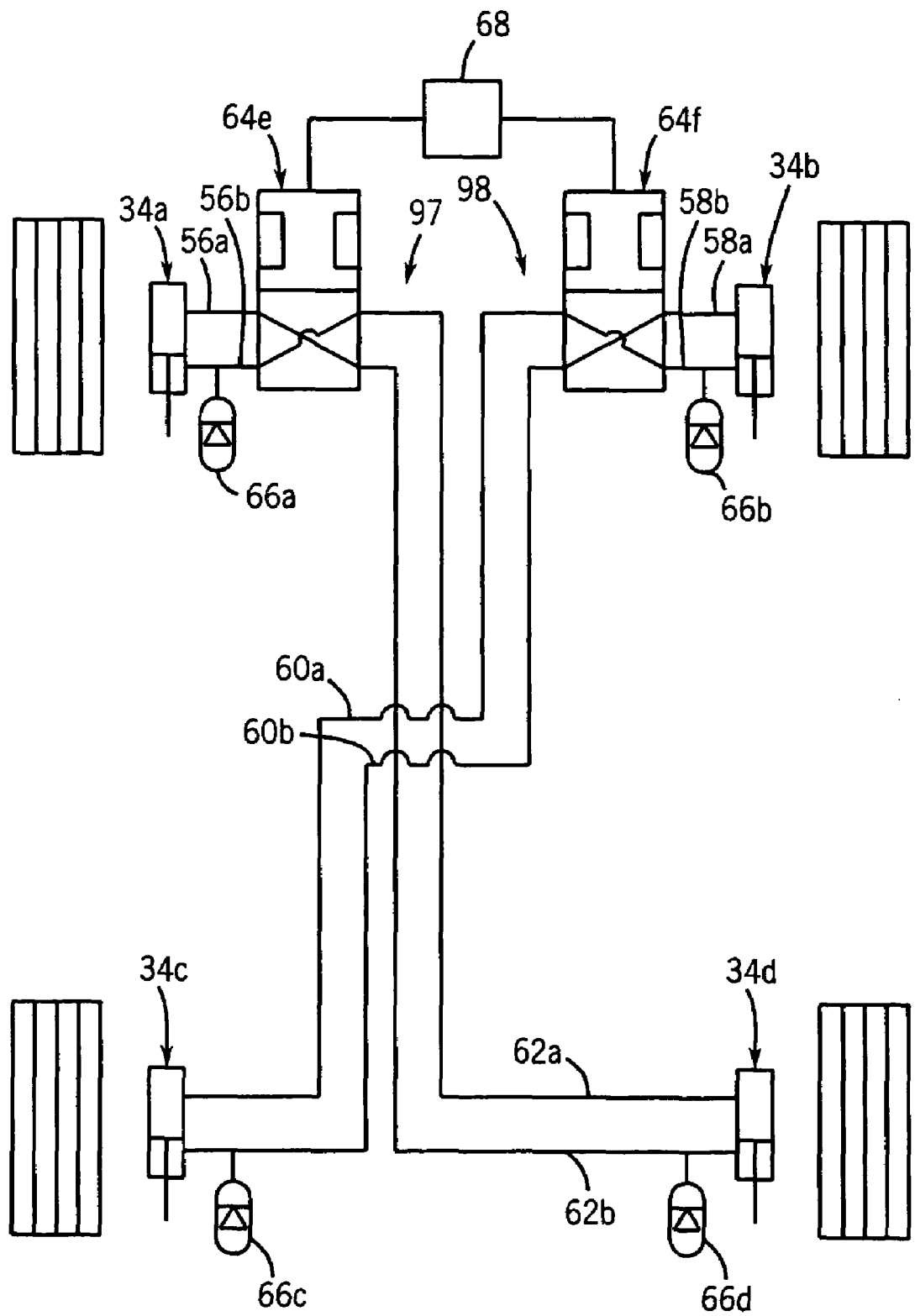
FIG. 6 is a schematic illustration of a portion of the suspension system according to another exemplary embodiment.

According to a fourth exemplary embodiment illustrated schematically in FIG. 6, hydraulic system 25 includes two substantially independent subsystems, a subsystem 97 that hydraulically couples cylinders 34a and 34d and a subsystem 98 that hydraulically couples cylinders 34b and 34c.

In subsystem 97, fluid lines 56a and 56b hydraulically couple upper chamber 48 and lower chamber 50 of cylinder 34a, respectively, to a valve designated as valve 64e, while fluid lines 62a and 62b hydraulically couple upper chamber 48 and lower chamber 50 of cylinder 34d, respectively, to valve 64e. An accumulator 66a is hydraulically coupled to fluid line 56b and an accumulator 66d is hydraulically coupled to fluid line 62b. Valve 64e is configured to be actuated between a cross-plumbed or cross-linked position and a straight-plumbed position. In the cross-plumbed position, valve 64e hydraulically couples fluid line 56a to fluid line 62b (e.g., upper chamber 48 of cylinder 34a is hydraulically coupled to lower chamber 50 of cylinder 34d) and hydraulically couples fluid line 56b to fluid line 62a (e.g., lower chamber 50 of cylinder 34a is hydraulically coupled to upper chamber 48 of cylinder 34d). In the straight-plumbed position, valve 64e hydraulically couples fluid line 56a to fluid line 56b (e.g., upper chamber 48 of cylinder 34a is coupled to lower chamber 50 of the same cylinder) and hydraulically couples fluid line 62a to fluid line 62b (e.g., upper chamber 48 of cylinder 34d is coupled to lower chamber 50 of the same cylinder).

Subsystem 98 is configured in the same general manner as subsystem 97. In subsystem 98, fluid lines 58a and 58b hydraulically couple upper chamber 48 and lower chamber 50 of cylinder 34b, respectively, to a valve designated as valve 64f, while fluid lines 60a and 60b hydraulically couple upper chamber 48 and lower chamber 50 of cylinder 34c, respectively, to valve 64f. An accumulator 66b is hydraulically coupled to fluid line 58b and an accumulator 66c is hydraulically coupled to fluid line 60b. Like valve 64e, valve 64f is configured to be actuated between a cross-plumbed position and a straight plumbed position. In the cross-plumbed position, valve 64f hydraulically couples fluid line 58a to fluid line 60b (e.g., upper chamber 48 of cylinder 34b is hydraulically coupled to lower chamber 50 of cylinder 34c) and hydraulically couples fluid line 58b to fluid line 60a (e.g., lower chamber 50 of cylinder 34b is hydraulically coupled to upper chamber 48 of cylinder 34c). In the straight-plumbed position, valve 64f hydraulically couples fluid line 58a to fluid line 58b (e.g., upper chamber 48 of cylinder 34b is coupled to lower chamber 50 of the same cylinder) and hydraulically couples fluid line 60a to fluid line 60b (e.g., upper chamber 48 of cylinder 34c is coupled to lower chamber 50 of the same cylinder).

The ability to move subsystems 97 and 98 of hydraulic system 25 between a cross-plumbed state and a straight plumbed state allows suspension system 16 to be adjusted to the configuration that is most suitable for the particular situation encountered by vehicle 10. When subsystems 97 and 98 are in the straight-plumbed position, upper chamber 48 of each cylinder 34a, 34b, 34c, and 34d is hydraulically coupled to lower chamber 50 of the same cylinder. Accordingly, each of cylinders 34a, 34b, 34c, and 34d operate substantially independently of one another. As discussed above, the independent operation of cylinder 34a, 34b, 34c, and 34d is generally desirable when vehicle 10 is traveling over relatively rough or bumpy terrain, such as on unpaved roads or on other off road terrain.

When subsystems 97 and 98 are in the cross-plumbed position, upper chamber 48 of cylinders 34a and 34b are hydraulically coupled to the respective lower chambers 50 of the corresponding cylinders 34d and 34c, and the lower chambers 50 of cylinders 34a and 34b are hydraulically coupled to the respective upper chambers 48 of cylinders 34d and 34c. Accordingly, the operation of the front cylinder on the left side of the vehicle (cylinder 34a) is linked to the operation of the rear cylinder on the right side of the vehicle (cylinder 34d) and the operation of the front cylinder on the right side of the vehicle (cylinder 34b) is linked to the operation of the rear cylinder on the left side of the vehicle (cylinder 34c). In this configuration, suspension system 16 tends to improve the handling and maneuverability of vehicle 10 when it is traveling at higher speeds on a relatively smooth roadway, such as a highway or interstate. Such improvement is the result, at least in part, of the tendency of suspension system 16 to resist both the roll and pitch of body portion 12 as vehicle 10 changes direction, accelerates, or decelerates, such as when it goes around a curve or bend in the road or when it slows down quickly. In these situations, allowing for the completely independent movement of wheel assemblies 24a, 24b, 24c, and 24d is less important because wheel assemblies 24a, 24b, 24c, and 24d move up and down in the same general manner due to the relatively smooth surface over which they are traveling.

According to various alternative or exemplary embodiments, the hydraulic system may take one of a variety of other configurations. The cylinders corresponding to any pair of wheel assemblies may be configured to operate independently of one another, may be configured so that the system coupling the two cylinders can be moved between a straight plumbed configuration and a cross-plumbed configuration, or may be configured so that one pair of cylinders are coupled to one or more other pairs of cylinders in such a way that all the linked cylinders on one side of the vehicle may be straight plumbed or may be cross-plumbed with all the linked cylinders on the other side of the vehicle. According to other various alternative and exemplary embodiments, the cylinders corresponding to one pair of wheel assemblies may be coupled together in the manner that is different than the manner in which the cylinders corresponding to another pair of wheel assemblies are coupled together. According to other various alternative and exemplary embodiments, one or more accumulators may be coupled to fluid lines extending from the upper chamber and/or the lower chamber of the cylinders. According to still other various alternative and exemplary embodiments, one or more of the different principles or configurations described above may be applied to the entire vehicle or may be applied to only a portion of the vehicle.

According to one exemplary embodiment, fluid may be added to or removed from hydraulic system 25 in order to adjust the ride height of vehicle 10. For example, by adding fluid to subsystem 52, the ride height of vehicle 10 may be increased, whereas by removing fluid from subsystem 52, the ride height of vehicle 10 may be decreased. The addition of fluid to subsystem 52 has the effect of increasing the equilibrium pressure within subsystem 52, which has the effect of extending the equilibrium length of cylinders 34a and 34b. Conversely, the removal of fluid from subsystem 52 has the effect of decreasing the equilibrium pressure within subsystem 52, which has the effect to decreasing the equilibrium length of cylinders 34a and 34b. According to one exemplary embodiment, control unit 68 monitors the ride height and/or system pressure and causes hydraulic system 25 or its various subsystems (through the use of a pump and reservoir) to increase or decrease the amount of fluid within each particular subsystem to adjust the ride height.

Referring again to FIG. 3, central tire inflation system 17 (shown schematically) is a system of components that is operably coupled to wheel assemblies 24a, 24b, 24c, and 24d and that is configured to monitor and adjust the air pressure within tire portion 33 of wheel assemblies 24a, 24b, 24c, and 24d based on user selected settings, terrain, vehicle loads, and/or other operational characteristics of the vehicle (such as vehicle speed, engine speed, etc.). By monitoring and adjusting the air pressure within tire portion 33 of wheel assemblies 24a, 24b, 24c, and 24d, central tire inflation system 17 is intended to improve the performance of vehicle 10 in each of the various situations in which vehicle 10 may operate. According to one exemplary embodiment, central tire inflation system 17 includes an air handling system 70, a control unit 72, and a switch 74.

Air handling system 70 is a system of pneumatic components that couples each of wheel assemblies 24a, 24b, 24c, and 24d to an air pressure source and that allows for the selective transport of air to one or more of wheel assemblies 24a, 24b, 24c, and 24d based on signals received from control unit 72. According to one exemplary embodiment, air handling system 70 includes an air source 76, a valve or manifold 78, and a series of air lines 80. Air source 76 may be any one of a variety of different sources of air, such as a mechanical air pump coupled to the engine of vehicle 10 that may be used to operate other components of vehicle 10 (such as the brakes, horn, etc.), a tank of pressurized air, an electric air pump coupled to the battery of vehicle 10, or other sources of air pressure. Manifold 78 is a valve arrangement that is coupled to air source 76 and air lines 80 and that is configured to selectively direct pressurized air to or from one or more of wheel assemblies 24a, 24b, 24c, and 24d (through different air lines 80) based on input from control unit 72. Air lines 80, which may include various tubes, pipes, and/or hoses, extend between wheel assemblies 24a, 24b, 24c, and 24d and manifold 78 and allow air from air source 76 to be transported from manifold 78 to any one or more of wheel assemblies 24a, 24b, 24c, and 24d.

Control unit 72 (e.g., a controller, computer, microcontroller, control module, etc.) is an electronic device (or multiple electronic devices coupled together) that monitors or measures the value of a variable quantity or condition and that sends signals to, or controls the operation of, manifold 78 based on the value of the variable quantity or condition. According to one exemplary embodiment, control unit 72 monitors or measures the condition of switch 74 as well as the air pressure of the air within tire portion 33 of wheel assemblies 24a, 24b, 24c, and 24d and controls the operation of manifold 78 based on the position of switch 74 and the air pressures. According to various alternative and exemplary embodiments, control unit 72 may monitor or measure one of a variety of different or additional variables or conditions, including the load carried by vehicle 10, the speed of vehicle 10, engine speed, transmission shifting, anti-lock braking systems, axle differential locks, the pressure within various portions of air handling system 70, etc. According to other various alternative and exemplary embodiments, the control unit may take one of a variety of different configurations, and may control or send signals to one or more of a variety of different components of vehicle 10. For example the control unit may be configured to control engine speed, transmission shifting, anti-lock braking systems, axle differential locks, and other components or devices of vehicle 10. The control unit of the central tire inflation system may also be configured to control the operation of the hydraulic system. According to still other various alternative and exemplary embodiments, the control unit may or may not be programmable.

Switch 74 (e.g., toggle, interface, button, etc.) is an interface that allows an occupant of vehicle 10 to adjust or set air handling system 70. Switch 74 is coupled to control unit 72 in such a way that control unit 72 monitors the position of switch 74 and alters the state or configuration of air handling system 70 as switch 74 is moved between its different positions. Accordingly, the occupant is able to selectively adjust the configuration of air handling system 70 (and ultimately hydraulic system 25, as discussed below) by moving switch 74 between its different positions.

According to one exemplary embodiment, switch 74 is a single switch that can be moved between four different positions: a highway position, a cross-country position, a mud-sand-snow position, and an emergency position. Control unit 72 is preset or programmed so that when switch 74 is moved to the highway position, control unit 72 causes manifold 78 to operate in a manner that makes the resulting configuration of air handling system 70 and wheel assemblies 24a, 24b, 24c, and 24d appropriate for use of vehicle 10 on the highway. Similarly, control unit 72 is present or programmed such that as switch 74 is moved to one of the other three positions, control unit 72 causes manifold 78 to operate in a manner that makes the resulting configuration of air handling system 70 and wheel assemblies 24a, 24b, 24c, and 24d appropriate for use of vehicle 10 in the condition corresponding to the particular position of switch 74.

According to an alternative embodiment, the switch may additionally include a load selection switch that allows the occupant to select a load setting that is closest to the actual load of vehicle 10. Based on the selected terrain and load settings, the control unit may be programmed to cause manifold 78 to operate in a manner that makes the resulting configuration of air handling system 70 and wheel assemblies 24a, 24b, 24c, and 24d appropriate for use of vehicle 10 in the conditions corresponding to the particular positions of the terrain portion and load portion of switch 74.

Using switch 74, the operator of vehicle 10 is able to adjust air handling system 70 based on the particular type of terrain over which vehicle 10 is traveling and/or on the load conditions of vehicle 10. This ability to adjust air handling system 70 helps improve the overall performance of vehicle 10 in the different conditions (e.g., terrain and load conditions) it may encounter.

Various embodiments of a central tire inflation system are commercially available from Eaton Corporation and from a variety of other sources.

According to one exemplary embodiment, control unit 68 of hydraulic system 25 is coupled to control unit 72 of central tire inflation system 17 and is programmed to configure hydraulic system 25 based on the state of central tire inflation system 17. Thus, when an occupant of vehicle 10 moves switch 74 into the highway position, for example, control unit 72 of central tire inflation system 17 causes central tire inflation system 17 to move into a configuration that is appropriate for use of vehicle 10 on the highway. Control unit 68 of hydraulic system 25 monitors control unit 72 so that when central tire inflation system 17 converts to a configuration that is appropriate for use of vehicle 10 on the highway, control unit 68 causes hydraulic system 25 to convert to a configuration that is appropriate for use of vehicle 10 on the highway.

According to one exemplary embodiment, control unit 68 is programmed to cause hydraulic system 25 (e.g., or each subsystem of hydraulic system 25) to move into the cross-plumbed configuration when central tire inflation system 17 converts to a configuration that is appropriate for use of vehicle 10 on the highway, and to cause hydraulic system 25 to move into the straight plumbed configuration when central tire inflation system 17 converts to a configuration that is appropriate for use of vehicle 10 on any other terrains (e.g., when central tire inflation system 17 converts into cross-country mode, a mud-sand-snow mode, or emergency mode). According to various alternative and exemplary embodiments, control unit 68 may cause less than all of the subsystems of hydraulic system 25 to switch between the cross-linked position and the straight plumbed position in response to a change in the state of central tire inflation system 17. According to another alternative and exemplary embodiment, control unit 68 may alternatively or additionally be programmed to adjust the ride height of vehicle 10 based on the configuration of central tire inflation system 17.

By linking the configuration of air handling system 70 and hydraulic system 25 to the type of terrain and/or load conditions (which correspond to the different switch positions), even a driver or occupant unfamiliar with how air handling system 70 and hydraulic system 25 operate and when particular configurations of air handling system 70 and hydraulic system 25 may be most appropriate will be able to place air handling system 70 and hydraulic system 25 in a configuration that is suitable for the particular situation. Furthermore, a driver familiar with the operation of central tire inflation system 17 and hydraulic system 25 is able to select a particular configuration of hydraulic system 25 by setting the central tire inflation system 17 to a certain setting, which gives the driver control over the operation of hydraulic system 25 that may be beneficial in unusual circumstances. Moreover, linking the configuration of air handling system 70 and hydraulic system 25 to the type of terrain and/or load conditions also helps to reduce the likelihood that hydraulic system 25 will switch to a cross-plumbed configuration when it is not desirable to do so (such as when the vehicle is traveling off road and hits a bump that causes a significant lateral acceleration) and therefore reduces the need for additional equipment or components that are intended reduce the likelihood that the hydraulic system will switch to an undesirable configuration.

According to various alternative embodiments, the suspension system described above may take a variety of different configurations and may be used with a variety of different vehicles. According to other alternative embodiments, the suspension system may be used with a variety of different components and may be used without one or more of the components described above, or it may be used in conjunction with components or elements other than those described above.

Although the present inventions have been described with reference to exemplary and alternative embodiments, workers skilled in the art will recognize that changes may be made in form and detail without departing from the spirit and scope of the invention. For example, although different exemplary and alternative embodiments may have been described as including one or more features providing one or more benefits, it is contemplated that the described features may be interchanged with one another or alternatively be combined with one another in the described exemplary embodiments or in other alternative embodiments. Because the technology of the present invention is relatively complex, not all changes in the technology are foreseeable. The present invention described with reference to the exemplary and alternative embodiments and set forth in the following claims is manifestly intended to be as broad as possible. For example, unless specifically otherwise noted, the claims reciting a single particular element also encompass a plurality of such particular elements.

What is claimed is:

1. A vehicle for use by an operator comprising:

a sprung portion; and an unsprung portion, the unsprung portion including:

a first wheel on a first side of the sprung portion;

a second wheel on a second side of the sprung portion, the second side being opposite the first side of the sprung portion;

a first hydraulic cylinder coupled between the first wheel and the sprung portion, the first hydraulic cylinder having an upper chamber and a lower chamber, the upper chamber and the lower chamber each having a volume configured to change as the first wheel and sprung portion move relative to one another;

a second hydraulic cylinder coupled between the second wheel and the sprung portion, the second hydraulic cylinder having an upper chamber and a lower chamber, the upper chamber and the lower chamber each having a volume configured to change as the second wheel and sprung portion move relative to one another; and a fluid circuit hydraulically coupled to the first hydraulic cylinder and the second hydraulic cylinder and including a valve movable between a first position and a second position, wherein when the valve is in the first position the upper chamber of the first hydraulic cylinder is hydraulically coupled to the lower chamber of the second hydraulic cylinder and the lower chamber of the first hydraulic cylinder is hydraulically coupled to the upper chamber of the second cylinder, and wherein when the valve is in the second position the upper chamber of the first hydraulic cylinder is hydraulically coupled to the lower chamber of the first hydraulic cylinder and the upper chamber of the second hydraulic cylinder is hydraulically coupled to the lower chamber of the second hydraulic cylinder;

a central tire inflation system operably coupled to the first wheel and the second wheel, and having a switch movable between a first setting representative of a highway operation mode and a second setting representative of one or more non-highway operation modes;

a control unit operable to monitor the position of the switch and move the valve to the first position when the switch is moved to the first setting and to move the valve to the second position when the switch is moved to the second setting.

2. The vehicle of claim 1, wherein the switch is configured to be actuated by the operator of the vehicle to selectively move the valve between the first position and the second position.

3. The vehicle of claim 1, wherein the valve is configured to move in response to manual input.

4. The vehicle of claim 1, further comprising at least one accumulator hydraulically coupled to the circuit.

5. The vehicle of claim 4, further comprising a first accumulator hydraulically coupled to the circuit between the upper chamber of the first hydraulic cylinder and the lower chamber of the second hydraulic cylinder, and a second accumulator hydraulically coupled to the circuit between the lower chamber of the first hydraulic cylinder and the upper chamber of the second hydraulic cylinder.

6. The vehicle of claim 1, wherein the first and second hydraulic cylinders are hydro-pneumatic springs.

7. The vehicle of claim 1, wherein the vehicle has a first ride height when the fluid circuit has a first volume of fluid and wherein the vehicle has a second ride height different than the first ride height when the fluid circuit has a second volume of fluid different than the first volume of fluid.

8. The vehicle of claim 1, wherein the first hydraulic cylinder and the second hydraulic cylinder each include a tube portion defining a main chamber, a piston movable within the main chamber, and a rod coupled to the piston, wherein the piston divides the main chamber into the upper chamber and the lower chamber, wherein the rod extends through the lower chamber, and wherein the piston has an upper surface area defining a portion of the upper chamber and the piston has a lower surface area surrounding the rod defining a portion of the lower chamber, the lower surface area being less than the upper surface area.

9. The vehicle of claim 8, wherein the ratio of the lower surface area of the piston to the upper surface area of the piston is between 1:2 and 1:4.

10. The vehicle of claim 1, further comprising a third wheel on the first side of the sprung portion and a fourth wheel on the second side of the sprung portion.

11. The vehicle of claim 10, further comprising a third hydraulic cylinder coupled between the third wheel and the sprung portion and a fourth hydraulic cylinder coupled between the fourth wheel and the sprung portion, wherein the third hydraulic cylinder includes an upper chamber and a lower chamber, the upper chamber and the lower chamber each having a volume configured to change as the third wheel and sprung portion move relative to one another, and wherein the fourth hydraulic cylinder includes an upper chamber and a lower chamber, the upper chamber and the lower chamber each having a volume configured to change as the fourth wheel and sprung portion move relative to one another.

12. The vehicle of claim 11, wherein the circuit is hydraulically coupled between the first hydraulic cylinder, the second hydraulic cylinder, the third hydraulic cylinder, and the fourth hydraulic cylinder.

13. The vehicle of claim 12, wherein when the valve is in the first position, the upper chamber of at least one of the first hydraulic cylinder and the third hydraulic cylinder is hydraulically coupled to the lower chamber of at least one of the second hydraulic cylinder and the fourth hydraulic cylinder and the lower chamber of the at least one of the first hydraulic cylinder and the third hydraulic cylinder is hydraulically coupled to the upper chamber of the at least one of the second hydraulic cylinder and the fourth hydraulic cylinder.

14. The vehicle of claim 13, wherein when the valve is in the second position, the upper chamber of the first hydraulic cylinder is hydraulically coupled to the lower chamber of at least one of the first hydraulic cylinder and the third hydraulic cylinder, the upper chamber of the second hydraulic cylinder is hydraulically coupled to the lower chamber of at least one of the second hydraulic cylinder and the fourth hydraulic cylinder, the upper chamber of the third hydraulic cylinder is hydraulically coupled to the lower chamber of at least one of the third hydraulic cylinder and the first hydraulic cylinder, and the upper chamber of the fourth hydraulic cylinder is hydraulically coupled to the lower chamber of at least one of the fourth hydraulic cylinder and the first hydraulic cylinder.

15. The vehicle of claim 14, wherein the first wheel and the second wheel are disposed proximate the front of the sprung portion, and wherein the third wheel and the fourth wheel are disposed proximate the rear of the sprung portion.

16. The vehicle of claim 14, wherein the first wheel, the second wheel, the third wheel, and the fourth wheel are disposed proximate the rear of the sprung portion.

17. A vehicle suspension system for use with a vehicle configured to be operated by an operator, the vehicle comprising a sprung portion, a first wheel and a third wheel on a first side of the sprung portion, and a second wheel and a fourth wheel on a second side of the sprung portion, the suspension system comprising:

a first hydraulic cylinder coupled between the first wheel and the sprung portion, the first hydraulic cylinder having an upper chamber and a lower chamber, each of the upper chamber and the lower chamber having a volume configured to change as the first wheel and sprung portion move relative to one another;

a second hydraulic cylinder coupled between the second wheel and the sprung portion, the second hydraulic cylinder having an upper chamber and a lower chamber, each of the upper chamber and the lower chamber having a volume configured to change as the second wheel and sprung portion move relative to one another;

a fluid circuit hydraulically coupled to the first hydraulic cylinder and the second hydraulic cylinder and including a valve movable between a first position and a second position, wherein when the valve is in the first position the upper chamber of the first hydraulic cylinder is hydraulically coupled to the lower chamber of the second hydraulic cylinder and the lower chamber of the first hydraulic cylinder is hydraulically coupled to the upper chamber of the second cylinder, and wherein when the valve is in the second position the upper chamber of the first hydraulic cylinder is hydraulically coupled to the lower chamber of the first hydraulic cylinder and the upper chamber of the second hydraulic cylinder is hydraulically coupled to the lower chamber of the second hydraulic cylinder; and wherein the valve is coupled to a switch in a central tire inflation system, the switch being movable between a first setting representative of a highway operation mode and a second setting representative of a non-highway operation mode, and a control unit operable to monitor the position of the switch and to move the valve to the first position when the central tire inflation system is in the highway operation mode, and to move the valve to the second position when the central tire inflation system is in the non-highway operation mode.

18. The vehicle suspension system of claim 17, wherein the switch is configured to be actuated by the operator of the vehicle.

19. The vehicle suspension system of claim 17, wherein the control unit is configured to adjust a ride height of the vehicle in response to the position of the switch in the central tire inflation system.

20. The vehicle suspension system of claim 17, further comprising at least one accumulator hydraulically coupled to the circuit.

21. The vehicle suspension system of claim 20, further comprising a first accumulator hydraulically coupled to the circuit between the upper chamber of the first hydraulic cylinder and the lower chamber of the second hydraulic cylinder, and a second accumulator hydraulically coupled to the circuit between the lower chamber of the first hydraulic cylinder and the upper chamber of the second hydraulic cylinder.

22. The vehicle suspension system of claim 17, wherein the first and second hydraulic cylinders are hydro-pneumatic springs.

23. The vehicle suspension system of claim 17, wherein the first hydraulic cylinder, the second hydraulic cylinder, and the fluid circuit are configured to give the vehicle a first ride height when the fluid circuit has a first volume of fluid and a second ride height different than the first ride height when the fluid circuit has a second volume of fluid different than the first volume of fluid.

24. The vehicle suspension system of claim 17, wherein the first hydraulic cylinder and the second hydraulic cylinder each include a tube portion defining a main chamber, a piston movable within the main chamber, and a rod coupled to the piston, wherein the piston divides the main chamber into the upper chamber and the lower chamber, wherein the rod extends through the lower chamber, and wherein the piston has an upper surface area defining a portion of the upper chamber and the piston has a lower surface area surrounding the rod defining a portion of the lower chamber, the lower surface area being less than the upper surface area.

25. The vehicle suspension system of claim 24, wherein the ratio of the lower surface area of the piston to the upper surface area of the piston is between 1:2 and 1:4.

26. The vehicle suspension system of claim 17, further comprising a third hydraulic cylinder coupled between the third wheel and the sprung portion and a fourth hydraulic cylinder coupled between the fourth wheel and the sprung portion, wherein the third hydraulic cylinder includes an upper chamber and a lower chamber, the upper chamber and the lower chamber each having a volume configured to change as the third wheel and sprung portion move relative to one another, and wherein the fourth hydraulic cylinder includes an upper chamber and a lower chamber, the upper chamber and the lower chamber each having a volume configured to change as the fourth wheel and sprung portion move relative to one another.

27. The vehicle suspension system of claim 26, wherein the fluid circuit is hydraulically coupled between the first hydraulic cylinder, the second hydraulic cylinder, the third hydraulic cylinder, and the fourth hydraulic cylinder.

28. The vehicle suspension system of claim 27, wherein when the valve is in the first position, the upper chamber of at least one of the first hydraulic cylinder and the third hydraulic cylinder is hydraulically coupled to the lower chamber of at least one of the second hydraulic cylinder and the fourth hydraulic cylinder and the lower chamber of the at least one of the first hydraulic cylinder and the third hydraulic cylinder is hydraulically coupled to the upper chamber of the at least one of the second hydraulic cylinder and the fourth hydraulic cylinder.

29. The vehicle suspension system of claim 28, wherein when the valve is in the second position, the upper chamber of the first hydraulic cylinder is hydraulically coupled to the lower chamber of at least one of the first hydraulic cylinder and the third hydraulic cylinder, the upper chamber of the second hydraulic cylinder is hydraulically coupled to the lower chamber of at least one of the second hydraulic cylinder and the fourth hydraulic cylinder, the upper chamber of the third hydraulic cylinder is hydraulically coupled to the lower chamber of at least one of the third hydraulic cylinder and the first hydraulic cylinder, and the upper chamber of the fourth hydraulic cylinder is hydraulically coupled to the lower chamber of at least one of the fourth hydraulic cylinder and the first hydraulic cylinder.

30. A method of coupling a suspension system to a vehicle having a sprung portion, a first wheel on a first side of the sprung portion, a first hydraulic cylinder coupled between the first wheel and the sprung portion, a second wheel on a second side of the sprung portion opposite the first side, a second hydraulic cylinder coupled between the second wheel and the sprung portion, and a central tire inflation system, the method comprising the steps of:

configuring the first hydraulic cylinder and the second hydraulic cylinder to move between a first state in which the first hydraulic cylinder and the second hydraulic cylinder are coupled to one another and a second state in which the first hydraulic cylinder and the second hydraulic cylinder are not coupled to one another;

coupling the first hydraulic cylinder to the second hydraulic cylinder so that when the first hydraulic cylinder and the second hydraulic cylinder are in the first state, the first hydraulic cylinder applies fluid pressure to the second hydraulic cylinder that acts to resist the movement of the second hydraulic cylinder in a first direction and the second hydraulic cylinder applies fluid pressure to the first hydraulic cylinder that acts to resist the movement of the first hydraulic cylinder in a second direction opposite the first direction;

providing a switch movable between a first position to operate the central tire inflation system in a first configuration representative of highway operation and a second configuration representative of non-highway operation; and providing a control unit operable to monitor the position of the switch and to move the first hydraulic cylinder and the second hydraulic cylinder between the first state and the second state in response to movement of the central tire inflation system between the first configuration and the second configuration.

31. The method of claim 30, wherein the step of coupling the first hydraulic cylinder to the second hydraulic cylinder further comprises the step of coupling an upper chamber of the first hydraulic cylinder to a lower chamber of the second hydraulic cylinder and coupling a lower chamber of the first hydraulic cylinder to an upper chamber of the second hydraulic cylinder when the first hydraulic cylinder and the second hydraulic cylinder are in the first state.

32. The method of claim 30, wherein the central tire inflation system is configured to move between the first configuration and the second configuration in response to a manual operation of the switch.

* * * * *